(12) United States Patent
Izumi et al.

(10) Patent No.: US 9,101,865 B2
(45) Date of Patent: Aug. 11, 2015

(54) HONEYCOMB STRUCTURE AND MANUFACTURING METHOD OF THE SAME

(71) Applicant: NGK INSULATORS, LTD., Nagoya (JP)

(72) Inventors: Yunie Izumi, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 161 days.

(21) Appl. No.: 13/848,274

(22) Filed: Mar. 21, 2013

(65) Prior Publication Data
US 2013/0255207 A1   Oct. 3, 2013

(30) Foreign Application Priority Data

Mar. 28, 2012 (JP) ................................. 2012-074207

(51) Int. Cl.
*B01D 39/06* (2006.01)
*B01D 39/20* (2006.01)
*B01D 39/14* (2006.01)
*B01D 46/00* (2006.01)
(Continued)

(52) U.S. Cl.
CPC ........ *B01D 46/0005* (2013.01); *B01D 46/0001* (2013.01); *B01D 46/2459* (2013.01); *C04B 35/111* (2013.01); *C04B 35/117* (2013.01); *C04B 35/565* (2013.01); *B01D 2046/2437* (2013.01); *C04B 2235/3217* (2013.01); *C04B 2235/3826* (2013.01); *C04B 2235/428* (2013.01); *C04B 2235/5292* (2013.01); *C04B 2235/5296* (2013.01); *C04B 2235/5436* (2013.01); *C04B 2235/663* (2013.01)

(58) Field of Classification Search
CPC .................. B01D 46/2429; B01D 2046/2433; B01D 2046/2437; B01D 2239/1216
See application file for complete search history.

(56) References Cited

U.S. PATENT DOCUMENTS 5,073,178 A   12/1991   Mimori et al.
5,198,006 A    3/1993   Mimori et al.
(Continued)

FOREIGN PATENT DOCUMENTS

EP   0 736 503 A1   10/1996
JP   2926187 B2      7/1999
(Continued)

OTHER PUBLICATIONS

Yukio Mizuno, et al., "Study on Wall Pore Structure for Next Generation Diesel Particulate Filter," SAE Technical Paper Series (SP-2154), 2008-01-0618.
(Continued)

*Primary Examiner* — Amber Orlando
(74) *Attorney, Agent, or Firm* — Burr & Brown, PLLC (57) ABSTRACT

There is disclosed a honeycomb structure which has an excellent collecting performance of a particulate matter and in which a pressure loss during flowing of a fluid through the honeycomb structure is low. The honeycomb structure includes a honeycomb base material having porous partition walls with which a plurality of cells are formed to become through channels of a fluid, a value of a ratio of an average open frontal area diameter of pores which are open in the surfaces of the partition walls to an average pore diameter of the pores formed in the partition walls is from 0.05 to 0.45, the partition walls have a single layer structure, and preferably, an open frontal area diameter of each of the pores which are open in the surfaces of the partition walls is from 0.5 to 10 μm.

5 Claims, 3 Drawing Sheets

(51) Int. Cl.
  *B01D 46/24*   (2006.01)
  *C04B 35/111*  (2006.01)
  *C04B 35/117*  (2006.01)
  *C04B 35/565*  (2006.01)

(56)  References Cited

U.S. PATENT DOCUMENTS

| | | | |
|---|---|---|---|
| 5,549,725 A * | 8/1996 | Kasai et al. | 55/523 |
| 6,746,760 B2 * | 6/2004 | Minemura et al. | 428/323 |
| 6,814,774 B2 * | 11/2004 | Ishihara et al. | 55/523 |
| 8,388,721 B2 * | 3/2013 | Ishizawa | 55/523 |
| 8,518,855 B2 * | 8/2013 | Ohno et al. | 502/351 |
| 8,608,820 B2 * | 12/2013 | Arnold et al. | 55/523 |
| 2005/0074374 A1 * | 4/2005 | Ogura | 422/180 |
| 2005/0207946 A1 * | 9/2005 | Asano et al. | 422/177 |
| 2007/0039297 A1 * | 2/2007 | Kawata et al. | 55/523 |
| 2009/0246458 A1 * | 10/2009 | Yamada et al. | 428/118 |
| 2010/0058725 A1 * | 3/2010 | Konomi et al. | 55/523 |
| 2010/0135866 A1 | 6/2010 | Mizuno et al. | |
| 2012/0240541 A1 * | 9/2012 | Isoda et al. | 55/523 |
| 2013/0316130 A1 * | 11/2013 | Takahashi et al. | 428/116 |

FOREIGN PATENT DOCUMENTS

| | | |
|---|---|---|
| JP | 3750178 B2 | 3/2006 |
| WO | 2008/136232 A1 | 11/2008 |

OTHER PUBLICATIONS

Osama Tokudome, et al., "Micro/Nano-Structures of High Porous Cordierite Ceramic Filter Substrate," 2004 JSAE Autumn Congress Proceeding No. 109-04, p. 1-4 (with English translation).

* cited by examiner

HONEYCOMB STRUCTURE AND MANUFACTURING METHOD OF THE SAME

The present application is an application based on JP-2012-074207 filed on Mar. 28, 2012 with the Japanese Patent Office, the entire contents of which are incorporated herein by reference.

BACKGROUND OF THE INVENTION

1. Field of the Invention

The present invention relates to a honeycomb structure and a manufacturing method of the honeycomb structure, and more particularly, it relates to a honeycomb structure which has an excellent collecting performance of a particulate matter and in which a pressure loss during flowing of a fluid through the honeycomb structure is low, and a manufacturing method of the honeycomb structure.

2. Background Art

In gases discharged from an internal combustion engine such as a diesel engine, various combustion devices, and the like, a large amount of particulate matter (PM) mainly constituted of soot is included. When this PM is discharged to the atmosphere as it is, an environmental pollution is caused. Therefore, in an exhaust system of the discharged gas, a diesel particulate filter (DPF) to collect the PM is disposed.

As this DPF, there has been used, for example, a honeycomb structure "including porous partition walls with which a plurality of cells are formed to become through channels of a fluid (an exhaust gas or a purified gas), and an outer peripheral wall positioned in the outermost periphery". The honeycomb structure for use as the DPF is a honeycomb structure usually "having plugged portions in open frontal areas of the predetermined cells in an end surface on an inflow side of the fluid (the exhaust gas) and open frontal areas of the remaining cells in the other end surface on an outflow side of the fluid (the purified gas)".

When the PM in the exhaust gas is collected by using such a honeycomb structure, the PM penetrates into the porous partition walls to close pores of the partition walls, thereby causing the problem that a pressure loss rapidly increases.

To suppress such increase of the pressure loss, a filter has been suggested in which a collecting layer to collect a PM is disposed on the surfaces of partition walls, and the collecting layer prevents the penetration of the PM into the partition walls, thereby suppressing the increase of the pressure loss (see Non-Patent Document 1 and Patent Documents 1 to 3). Moreover, a high-porosity cordierite ceramic filter base material has been suggested in which pores have a spherical shape (e.g., see Non-Patent Document 2).

[Patent Document 1] JP 3750178-B
[Patent Document 2] JP 2926187-B
[Patent Document 3] WO 2008/136232-A

Non-Patent Documents

[Non-Patent Document 1] SAE Technical Paper 2008-01-0618, Society of Automotive Engineers (2008)
[Non-Patent Document 2] 2004 JSAE Autumn Congress Proceeding No. 109-04 183 Micro/Nano-Structures of High Porous Cordierite Ceramic Filter Substrate

SUMMARY OF THE INVENTION

In a conventional filter, it has not been considered that both a high collecting performance and a pressure loss decreasing effect are surely sufficiently achieved.

The present invention has been developed in view of the above-mentioned problem, and an object thereof is to provide a honeycomb structure which has an excellent collecting performance of a particulate matter and in which a pressure loss during flowing of a fluid through the structure is low, and a manufacturing method of the honeycomb structure.

[1] A honeycomb structure comprising a honeycomb base material having porous partition walls with which a plurality of cells are formed to become through channels of a fluid, wherein a value of a ratio of an average open frontal area diameter of pores which are open in the surfaces of the partition walls to an average pore diameter of the pores formed in the partition walls is from 0.05 to 0.45, and the partition walls have a single layer structure.

[2] The honeycomb structure according to the above [1], wherein an open frontal area diameter of each of the pores which are open in the surfaces of the partition walls is from 0.5 to 10 µm.

[3] The honeycomb structure according to the above [1] or [2], wherein the average pore diameter of the partition walls is from 5.0 to 30.0 µm.

[4] The honeycomb structure according to any one of the above [1] to [3], wherein a surface open area ratio of the partition walls is from 20 to 40%.

[5] The honeycomb structure according to any one of the above [1] to [4], wherein a material of the partition walls includes at least one selected from the group consisting of silicon carbide, a silicon-silicon carbide composite material, alumina, cordierite and aluminum titanate.

[6] The honeycomb structure according to any one of the above [1] to [5], comprising plugged portions arranged in open frontal areas of the predetermined cells in one end surface of the honeycomb base material and open frontal areas of the remaining cells in the other end surface of the honeycomb base material.

[7] A manufacturing method of a honeycomb structure, comprising a forming step of extruding a ceramic forming raw material containing a ceramic raw material including 14 to 100 vol % of a plate-like raw material having an aspect ratio of 5 to 70, to obtain a formed honeycomb body including unfired partition walls with which a plurality of cells are formed to become through channels of a fluid; and a firing step of firing the formed honeycomb body to prepare the honeycomb structure.

[8] The manufacturing method of the honeycomb structure according to the above [7], wherein the ceramic raw material contains a pore former, and a value of a ratio of a long diameter of the plate-like raw material to a median diameter of the pore former is 0.07 or more.

[9] The manufacturing method of the honeycomb structure according to the above [7] or [8], wherein the plate-like raw material is at least one selected from the group consisting of alumina, silicon carbide, silicon nitride, mica, talc, kaolin, aluminum hydroxide, boehmite and titania.

In a honeycomb structure of the present invention, a value of a ratio of "an average open frontal area diameter of pores which are open in the surfaces of partition walls" to "an average pore diameter of the pores formed in the partition walls" is from 0.05 to 0.45, and the partition walls have a single layer structure. Therefore, the honeycomb structure of the present invention has an excellent collecting performance of a particulate matter, and a pressure loss during flowing of a fluid through the structure is low.

In a manufacturing method of the honeycomb structure of the present invention, a ceramic forming raw material containing a ceramic raw material including 14 to 100 vol % of a plate-like raw material having an aspect ratio of 5 to 70 is extruded, to prepare a formed honeycomb body. Therefore, according to the manufacturing method of the honeycomb structure of the present invention, the honeycomb structure of the present invention can be obtained.

DETAILED DESCRIPTION OF THE INVENTION

Hereinafter, embodiments of the present invention will specifically be described with reference to the drawings. The present invention is not limited to the following embodiments. It should be understood that suitable modifications, improvements and the like added to the following embodiments on the basis of ordinary knowledge of a person skilled in the art without departing from the gist of the present invention also fall in the scope of the present invention.

Figure 1:
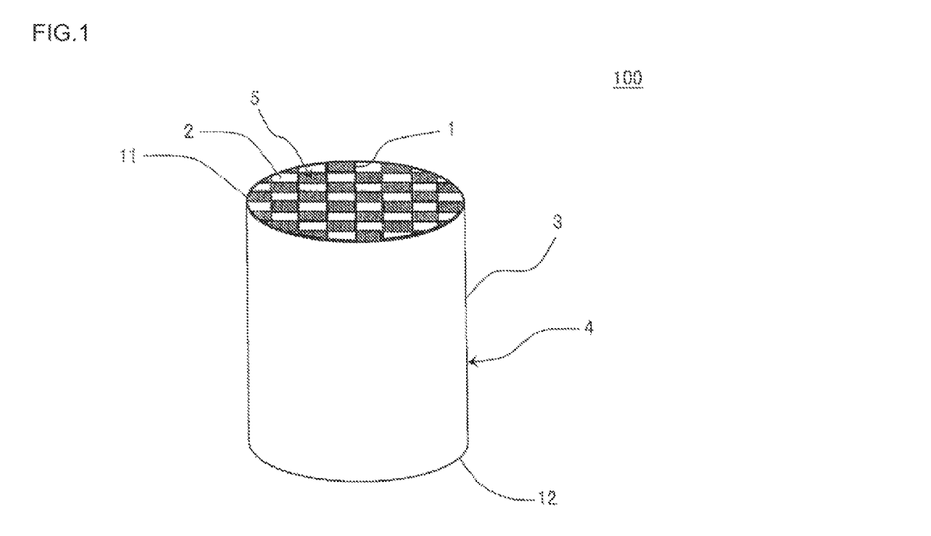
FIG. 1 is a perspective view schematically showing an embodiment of a honeycomb structure of the present invention.
Figure 2:
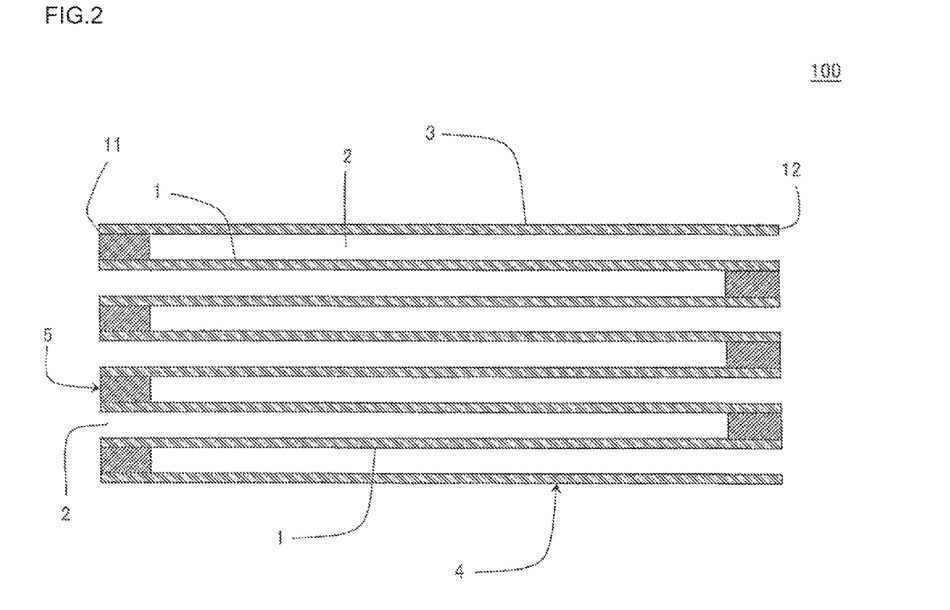
FIG. 2 is a schematic view showing a cross section of the embodiment of the honeycomb structure of the present invention which is parallel to a cell extending direction.

(1) Honeycomb Structure:

As shown in FIG. 1 and FIG. 2, an embodiment of a honeycomb structure of the present invention (a honeycomb structure 100) includes a honeycomb base material 4 having "porous partition walls 1 with which "a plurality of cells 2" are formed to "become through channels of a fluid"". Moreover, in the honeycomb structure 100 of the present embodiment, a value of a ratio of "an average open frontal area diameter of pores which are open in the surfaces of the partition walls 1" to "an average pore diameter of the pores formed in the partition walls 1" is from 0.05 to 0.45. Furthermore, in the honeycomb structure 100 of the present embodiment, the partition walls 1 have a single layer structure (the one layer structure). The honeycomb base material 4 is provided with an outer peripheral wall 3 so as to surround an outer periphery. The surface of the outer peripheral wall 3 is a side surface of the honeycomb base material 4. Moreover, in the honeycomb base material 4, the cells 2 are open in one end surface 11 and the other end surface 12 (both the end surfaces). Furthermore, the honeycomb structure 100 of the present embodiment is provided with plugged portions 5 arranged in open frontal areas of the predetermined cells 2 in the one end surface 11 of the honeycomb base material 4 and open frontal areas of the remaining cells 2 in the other end surface 12 of the honeycomb base material 4.

Thus, in the honeycomb structure 100 of the present embodiment, the ratio of "the average open frontal area diameter of the pores which are open in the surfaces of the partition walls 1" to "the average pore diameter of the pores formed in the partition walls 1" is very small (in the above range). Therefore, the honeycomb structure of the present invention has an excellent collecting performance of a particulate matter, and a pressure loss during flowing of the fluid through the honeycomb structure is low.

In the honeycomb structure 100 of the present embodiment, "the average open frontal area diameter of the pores which are open in the surfaces of the partition walls 1" means an average diameter (the average value of short diameters) of "the open frontal areas of the pores". Here, "the open frontal areas of the pores" are pore "portions which are open in the surfaces of the partition walls 1". "The average open frontal area diameter of the pores which are open in the surfaces of the partition walls 1" will be referred to as "the surface open area diameter" sometimes. "The surface open area diameter" is a value obtained by the following method. First, an SEM (scanning electron microscope) photograph of the surface of a partition wall is taken. A magnification of the SEM photograph is 500 times. Then, the average value of the short diameters of "the open frontal areas of the pores" in the surface of the partition wall in a region of 50 μm×120 μm is "the surface open area diameter". The short diameters of "the open frontal areas of the pores" can be measured by, for example, the following method. Photographed image data is binarized by using image analysis software "Image-Pro0.5J" (manufactured by NVS Inc.), to clarify a contour of each of the pores. Then, the short diameter of "the open frontal area of the pore" is measured from the obtained data. The short diameter of "the open frontal area of the pore" is the shortest diameter of "the open frontal area of the pore". For example, in the case of a circular shape, a diameter of the shape becomes the short diameter. Moreover, in the case of an elliptic shape, a length of a short axis is the short diameter. Furthermore, in the case of another shape, a length of "the shortest line segment among line segments each of which connects two points on an outer periphery of the shape is the short diameter".

In the honeycomb structure 100 of the present embodiment, the value of the ratio of "the average open frontal area diameter of the pores which are open in the surfaces of the partition walls 1" to "the average pore diameter of the pores formed in the partition walls 1" is from 0.05 to 0.45. Moreover, a lower limit value of the value of the ratio of "the average open frontal area diameter of the pores which are open in the surfaces of the partition walls 1" to "the average pore diameter of the pores formed in the partition walls 1" is preferably 0.20. An upper limit value of the value of the ratio of "the average open frontal area diameter of the pores which are open in the surfaces of the partition walls 1" to "the average pore diameter of the pores formed in the partition walls 1" is preferably 0.30. When the value is smaller than 0.05, the pressure loss increases sometimes. When the value is larger than 0.45, the collecting performance of the particulate matter deteriorates sometimes. The average pore diameter is a value measured by a mercury porosimeter.

In the honeycomb structure 100 of the present embodiment, the partition walls 1 have the single layer structure. Therefore, in the honeycomb structure 100, the pressure loss during the flowing of the fluid through the structure is low. Here, "the partition walls have a single layer" means that the whole partition wall is constituted of one layer. For example, a structure in which a base material is provided with a film is a two-layer structure, and is not the single layer structure. The partition walls 1 of the honeycomb structure 100 of the present embodiment do not have such a two-layer structure, and hence it is possible to suppress complication and increase of manufacturing steps during manufacturing of the honeycomb structure of the present embodiment. Moreover, when the partition walls have a structure in which "a plurality of layers having different porosities (e.g., a ceramic layer, etc.)" or "a plurality of layers made of different materials" are laminated, the partition walls have a structure of the plurality of layers, and are not included in "the partition walls having the single layer".

In the honeycomb structure 100 of the present embodiment, open frontal area diameters of the pores which are open in the surfaces of the partition walls 1 are preferably from 0.5 to 10 µm. An upper limit value of the open frontal area diameters of the pores which are open in the surfaces of the partition walls 1 is further preferably 5.0 µm, and especially preferably 2.0 µl. When the open frontal area diameters of the pores which are open in the surfaces of the partition walls 1 are smaller than 0.5 µm, an initial pressure loss increases sometimes. When the open frontal area diameters of the pores which are open in the surfaces of the partition walls 1 are larger than 10 µm, the collecting performance of the particulate matter deteriorates sometimes. Furthermore, when the open frontal area diameters of the pores which are open in the surfaces of the partition walls 1 are larger than 10 µm, the particulate matter is deposited in the pores sometimes. Therefore, the increase of the pressure loss during the deposition of the particulate matter (the pressure loss with soot) cannot be "suitably suppressed" sometimes.

In the honeycomb structure 100 of the present embodiment, the average pore diameter of the partition walls is preferably from 5.0 to 30 µm. An upper limit value of the average pore diameter of the partition walls is further preferably 20.0 µm. When the value is smaller than 5.0 µm, the pressure loss increases sometimes. When the value is larger than 30.0 µm, the collecting performance of the particulate matter deteriorates sometimes.

In the honeycomb structure of the present embodiment, a surface open area ratio of the partition walls is preferably from 20 to 40%. When an open area ratio of the surface of a collecting layer is in the above range, the increase of the pressure loss with soot can further suitably be suppressed. When the open area ratio of the surface of the collecting layer is in excess of 40%, a collecting efficiency of the particulate matter decreases, and the pressure loss with soot noticeably increases sometimes. The surface open area ratio of the partition walls is a value measured by the following method. The SEM (scanning electron microscope) photograph of the surface of the partition wall is taken, and a ratio of "the open frontal areas of the pores" in the surface of the partition wall in the region of 50×120 µm is the surface open area ratio. The magnification of the SEM photograph is 500 times.

Figure 5:
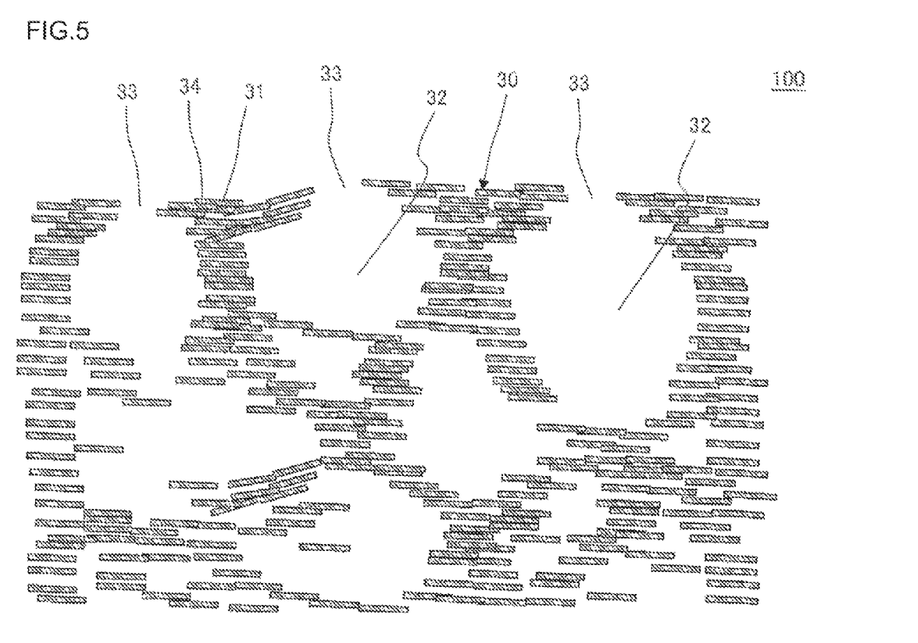
FIG. 5 is an enlarged schematic view showing "a cross section" of a partition wall of the embodiment of the honeycomb structure of the present invention "which is perpendicular to the cell extending direction"
Figure 6:
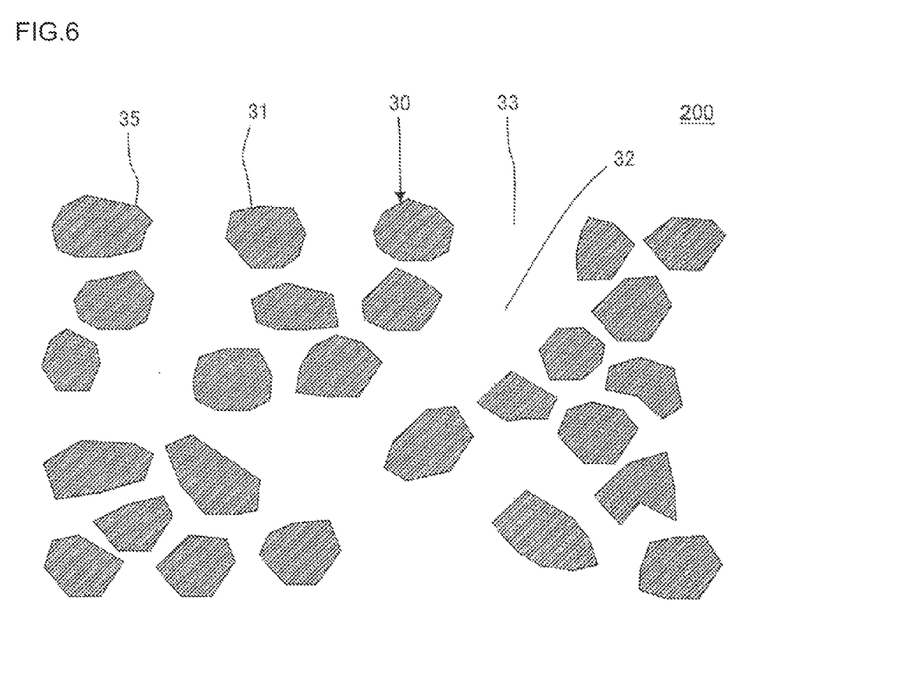
FIG. 6 is an enlarged schematic view showing "a cross section" of a partition wall of a conventional honeycomb structure "which is perpendicular to a cell extending direction".

In the honeycomb structure 100 of the present embodiment, a material of the partition walls preferably includes at least one selected from the group consisting of silicon carbide, a silicon-silicon carbide composite material, alumina, cordierite and aluminum titanate. Moreover, in the honeycomb structure 100 of the present embodiment, the material of the partition walls preferably includes, as a main component, at least one selected from the group consisting of silicon carbide, the silicon-silicon carbide composite material, and cordierite. In the silicon-silicon carbide composite material, SiC aggregates are bound to one another via Si which is a binding agent. Here, the main component is a component contained as much as 50 mass % or more in the whole material. Furthermore, the partition walls are preferably obtained by forming and firing a ceramic forming raw material containing "a ceramic raw material including 14 to 100 vol % of a plate-like raw material having an aspect ratio of 5 to 70". The ceramic raw material which is a denominator of a content ratio of the plate-like raw material is the whole inorganic raw material obtained by extruding the binding agent, a pore former, a binder, water, a surfactant and the like from the ceramic forming raw material. That is, a volume of the aggregates which form the porous partition walls of the obtained honeycomb structure is the denominator. When the material of the partition walls is, for example, the silicon-silicon carbide composite material, the ceramic forming raw material includes, for example, Si (the binding agent), SiC (the aggregates), the pore former, the binder, the surfactant, and the water. In this case, "the ceramic raw material includes 14 to 100 vol % of the plate-like raw material" means that "when a total volume of SiC is 100, 14 to 100 of SiC is the plate-like raw material". Moreover, when the ceramic forming raw material does not contain any binding agents, the aggregates are sintered and bound together as in a case where the aggregates are alumina. In this case, for example, the ceramic forming raw material includes alumina, the pore former, the binder, the surfactant and the water. In this case, "14 to 100 vol % of the ceramic raw material is the plate-like raw material" means that "when a total volume of alumina is 100, 14 to 100 of alumina is the plate-like raw material". The plate-like raw material is preferably at least one selected from the group consisting of silicon carbide, alumina, silicon nitride, mica, talc, kaolin, aluminum hydroxide, boehmite and titania. When the material of the partition walls include, as the main component, silicon carbide or "the silicon-silicon carbide composite material", the silicon carbide may be the plate-like raw material, or another component such as alumina may be contained as the plate-like raw material. When the partition walls 1 contain the plate-like raw material, the ratio of "the average open frontal area diameter of the pores which are open in the surfaces of the partition walls 1" to "the average pore diameter of the pores formed in the partition walls 1" can more effectively be decreased. FIG. 5 shows an enlarged schematic view of "a cross section" of a partition wall 30 of the honeycomb structure 100 of the present embodiment "which is perpendicular to the cell extending direction". As shown in FIG. 5, a plate-like raw material 34 is contained in the partition wall 30, so that open frontal areas 33 formed in a surface 31 are narrowed by the plate-like raw material 34. In consequence, the ratio of "the average open frontal area diameter of the pores which are open in the surfaces of the partition walls" to "the average pore diameter of the pores formed in the partition walls" can more effectively decrease. On the other hand, FIG. 6 shows, as an example of a conventional honeycomb structure, a honeycomb structure 200 in which partition walls are formed by a granular raw material. FIG. 6 is an enlarged schematic view showing "a cross section" of a partition wall 30 of the conventional honeycomb structure 200 "which is perpendicular to a cell extending direction". As shown in FIG. 6, in the honeycomb structure 200 in which the partition wall 30 is formed by a granular raw material 35, an open frontal area 33 formed in a surface 31 has a size of the same degree as that of a pore 32 formed in the partition wall 30.

A porosity of the partition walls 1 is preferably from 40 to 80%. A lower limit value of the porosity is further preferably 52. An upper limit value of the porosity is further preferably 70%. When the porosity is smaller than 40%, the initial pressure loss increases sometimes. Moreover, when the porosity is larger than 80%, a strength of the honeycomb structure decreases sometimes. In the present description, the porosity is a value calculated from a total pore volume (unit: cm³/g) by mercury porosimetry (in conformity to JIS R 1655) and an apparent density (unit: g/cm³) measured by an Archimedes method. To calculate the porosity, an equation "the porosity [%]=the total pore volume/{(1/the apparent density)+the total pore volume}×100" is used.

In the honeycomb structure 100 of the present embodiment, there is not any special restriction on a shape of the honeycomb base material 4, but the shape is preferably a cylindrical shape, a tubular shape in which an end surface is elliptic, a tubular shape in which the end surface has a polygonal shape such as "a square shape, a rectangular shape, a triangular shape, a pentangular shape, a hexagonal shape, a heptagonal shape or an octagonal shape", or the like. In the honeycomb structure 100 shown in FIG. 1 and FIG. 2, the shape is the cylindrical shape. Moreover, the honeycomb structure 100 shown in FIG. 1 and FIG. 2 has the outer peripheral wall 3, but may not have the outer peripheral wall 3. The outer peripheral wall 3 is preferably formed together with the partition walls during extrusion-forming of a formed honeycomb body in a process of preparing the honeycomb structure. Moreover, the outer peripheral wall 3 may be formed by coating, with a ceramic material, an outer periphery of the partition walls formed in the honeycomb structure (e.g., a portion corresponding to a side surface of the cylindrical shape).

In the honeycomb structure 100 of the present embodiment, there is not any special restriction on a cell shape of the honeycomb base material 4 (the cell shape in a cross section perpendicular to a center axis direction of the honeycomb structure (the cell extending direction)). Examples of the cell shape of the honeycomb base material 4 include a triangular shape, a quadrangular shape, a hexagonal shape, an octagonal shape, a circular shape, and combinations of these shapes. In the quadrangular shape, a square shape or a rectangular shape is preferable.

In the honeycomb structure 100 of the present embodiment, there is not any special restriction on a cell density of the honeycomb base material 4, but the cell density is preferably from 16 to 96 cells/cm². Moreover, a lower limit value of the cell density of the honeycomb base material 4 is further preferably 30 cells/cm². Furthermore, an upper limit value of the cell density of the honeycomb base material 4 is further preferably 64 cells/cm². When the cell density is smaller than 16 cells/cm², an area of the partition walls to collect the particulate matter decreases, and when an exhaust gas is allowed to flow through the structure, the pressure loss increases in a short time sometimes. When the cell density is larger than 96 cells/cm², a cross sectional area of each cell (the area of the cross section perpendicular to the cell extending direction) decreases, and hence the pressure loss increases sometimes.

The honeycomb structure 100 of the present embodiment preferably includes plugged portions 5 arranged in the open frontal areas of the predetermined cells 2 in the one end surface 11 of the honeycomb base material 4 and the open frontal areas of the remaining cells 2 in the other end surface 12 of the honeycomb base material 4. In consequence, the particulate matter in the exhaust gas is easily collected by the partition walls. The cells 2 provided with the plugged portions 5 in the open frontal areas in the one end surface 11 and the cells 2 provided with the plugged portions 5 in the open frontal areas in the other end surface 12 are preferably alternately arranged. In this case, a checkered pattern is formed by the open frontal areas of the cells 2 and the plugged portions 5 in each of the end surfaces of the honeycomb base material 4. In consequence, the particulate matter in the exhaust gas is further easily collected by the partition walls.

Figure 3:
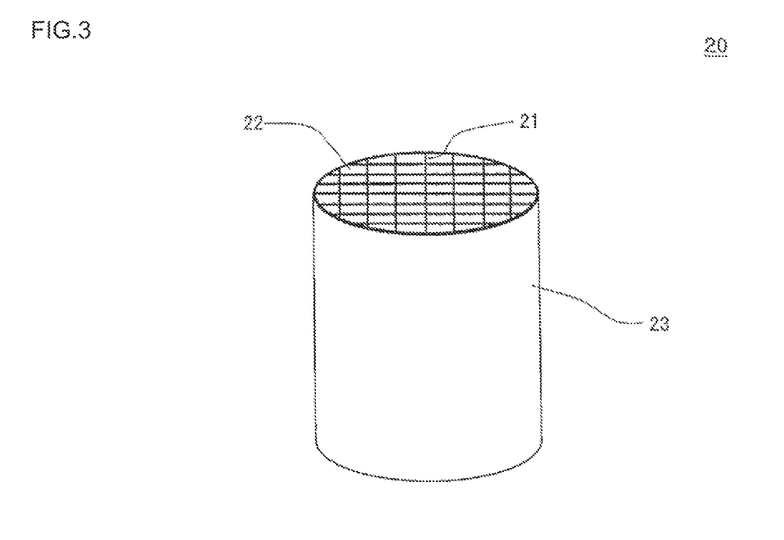
FIG. 3 is a perspective view schematically showing a formed honeycomb body prepared in a forming step of an embodiment of a manufacturing method of the honeycomb structure of the present invention.
Figure 4:
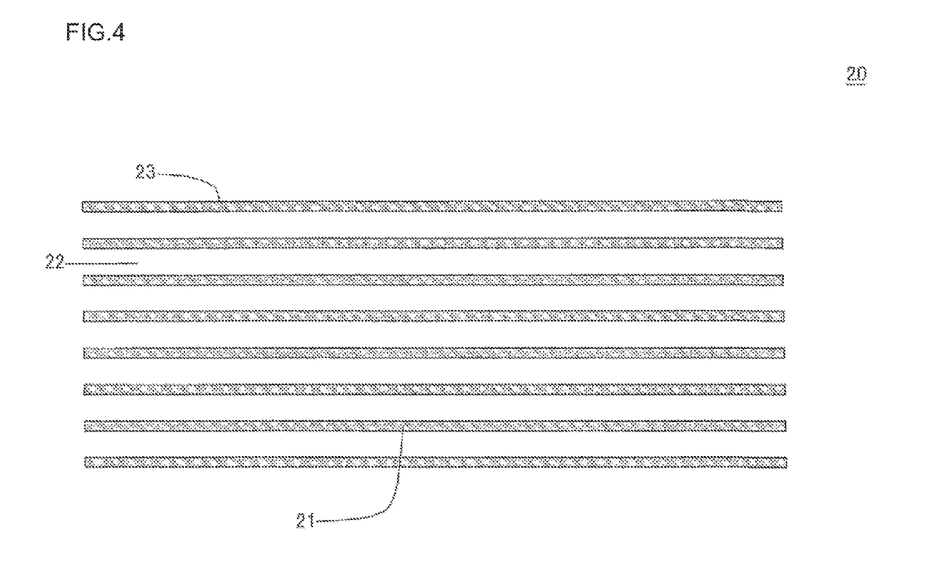
FIG. 4 is a schematic view showing a cross section of the formed honeycomb body prepared in the forming step of the embodiment of the manufacturing method of the honeycomb structure of the present invention which is parallel to the cell extending direction.

(2) Manufacturing Method of Honeycomb Structure:

An embodiment of a manufacturing method of the honeycomb structure of the present invention has a forming step and a firing step. The forming step is a step of extruding the ceramic forming raw material containing the ceramic raw material including 14 to 100 vol % of the plate-like raw material having the aspect ratio of 5 to 70, to obtain the formed honeycomb body. As shown in FIG. 3 and FIG. 4, a formed honeycomb body 20 includes unfired partition walls 21 with which a plurality of cells 22 are formed to become the through channels of the fluid. The formed honeycomb body 20 shown in FIG. 3 and FIG. 4 is provided with an outer peripheral wall (the unfired outer peripheral wall) 23. The firing step is a step of firing the formed honeycomb body 20 to prepare the honeycomb structure. FIG. 3 is a perspective view schematically showing the formed honeycomb body 20 prepared in the forming step of the embodiment of the manufacturing method of the honeycomb structure of the present invention. FIG. 4 is a schematic view showing a cross section of the formed honeycomb body 20 prepared in the forming step of the embodiment of the manufacturing method of the honeycomb structure of the present invention which is parallel to an extending direction of the cells 22.

In the manufacturing method of the honeycomb structure of the present embodiment, the ceramic forming raw material containing the ceramic raw material including 14 to 100 vol % of the plate-like raw material having the aspect ratio of 5 to 70 is extruded, to obtain the formed honeycomb body. Therefore, the honeycomb structure of the present invention can be manufactured. That is, by the extrusion-forming, "the plate-like raw material is aligned in an extruding direction so as to narrow the open frontal areas of the pores which are open in the surfaces of the partition walls". Therefore, diameters of the open frontal areas decrease, and "the surface open area diameter" decreases. Further specifically, when the plate-like raw material is aligned in the extruding direction, the plate-like raw material is disposed so that "the surface of the plate-like raw material is substantially parallel to the surface of each of the partition walls" in the vicinity of the surface of the partition wall. Therefore, part of the vicinities of the outer peripheries of the open frontal areas of the pores is closed with the plate-like raw material. Consequently, the diameter of the open frontal area of each of the pores decreases. In consequence, a value of a ratio of "the surface open area diameter" to "the average pore diameter of the pores" is a small value (0.05 to 0.45).

Hereinafter, the manufacturing method of the honeycomb structure of the present embodiment will be described every step.

(2-1) Forming Step:

First, in the forming step, the ceramic forming raw material containing "the ceramic raw material including 14 to 100 vol % of "the plate-like raw material having the aspect ratio of 5 to 70"" is extruded, to obtain the formed honeycomb body.

In the manufacturing method of the honeycomb structure of the present embodiment, the ceramic raw material contained in the ceramic forming raw material includes 14 to 100 vol % of "the plate-like raw material having the aspect ratio of 5 to 70". Moreover, the ceramic raw material further preferably includes 20 to 50 vol % of "the plate-like raw material having the aspect ratio of 5 to 70". Here, "the ceramic raw material includes 100 vol % of "the plate-like raw material having the aspect ratio of 5 to 70"" means that the whole ceramic raw material is "the plate-like raw material having the aspect ratio of 5 to 70". The aspect ratio of the plate-like raw material is a value obtained by dividing a median diameter measured by a laser diffraction method by a short diameter (the thickness) of each particle which is measured from an SEM image.

When the content of "the plate-like raw material having the aspect ratio of 5 to 70" in the ceramic raw material is smaller than 14 vol %, the effect of decreasing "the surface open area diameter" of the obtained honeycomb structure unfavorably decreases.

The aspect ratio of the plate-like raw material included in the ceramic raw material is preferably from 5 to 70. When the aspect ratio is smaller than 5, the effect of decreasing "the surface open area diameter" of the obtained honeycomb structure and controlling the ratio of the surface open area diameter to the average pore diameter to a desirable range unfavorably deteriorates. When the aspect ratio is in excess of 70, at the formation, clogging of a die takes place, thereby unfavorably causing a forming defect.

The plate-like raw material is preferably at least one selected from the group consisting of alumina, silicon carbide, silicon nitride, mica, talc, kaolin, aluminum hydroxide and boehmite. A lower limit value of an average particle diameter (the long diameter) of the plate-like raw material is preferably 10 µm, and further preferably 15 µm. An upper limit value of the average particle diameter (the long diameter) of the plate-like raw material is preferably 50 µm, and further preferably 35 µm. The average particle diameter of the plate-like raw material is a value measured by the laser diffraction method.

The ceramic raw material preferably includes at least one selected from the group consisting of silicon carbide, a silicon-silicon carbide composite material, a cordierite forming raw material, silicon nitride, mullite and alumina. Moreover, the ceramic raw material preferably contains, as a main component, at least one selected from the group consisting of silicon carbide, the silicon-silicon carbide composite material and the cordierite forming raw material. Here, the main component is a component contained as much as 50 mass % or more of the whole material. Furthermore, the cordierite forming raw material is the ceramic raw material blended so as to have a chemical composition in which silica falls in a range of 42 to 56 mass %, alumina falls in a range of 30 to 45 mass % and magnesia falls in a range of 12 to 16 mass %, and the material is fired to become cordierite. A lower limit value of the average particle diameter of the ceramic raw material is preferably 5 and further preferably 10 µm. An upper limit value of the average particle diameter of the ceramic raw material is preferably 100 µm, and further preferably 40 µm. The average particle diameter of the ceramic raw material is a value measured by the laser diffraction method.

When the ceramic raw material contains silicon carbide or "the silicon-silicon carbide composite material" as the main component, the silicon carbide may be the plate-like raw material, or another component such as alumina may be contained as the plate-like raw material. Moreover, when the ceramic raw material contains the cordierite forming raw material as the main component, part of the cordierite forming raw material may be the plate-like raw material, or another component may be contained as the plate-like raw material.

In the manufacturing method of the honeycomb structure of the present embodiment, the ceramic forming raw material is preferably prepared by mixing the above ceramic raw material with the pore former, the binder, the surfactant, the water and the like.

As the pore former, starch, carbon, resin balloons, polymethyl methacrylate (PMMA), a water-absorbing resin or a combination of these materials is preferably used. Moreover, an average particle diameter of the pore former is preferably from 10 to 60 µm. Moreover, an amount of the pore former to be added is preferably from 5 to 75 parts by mass to 100 parts by mass of the ceramic raw material. Additionally, when the pore former is the water-absorbing resin, the average pore diameter is a value after water absorption.

A value of a ratio of the long diameter of the plate-like raw material to the median diameter of the pore former is preferably 0.07 or more. The median diameter of the pore former is a value measured by the laser diffraction method. The long diameter of the plate-like raw material is a value measured by the laser diffraction method.

The binder is preferably methylcellulose, hydroxypropyl methylcellulose, hydroxypropyl ethylcellulose, hydroxyethylcellulose, carboxymethylcellulose, polyvinyl alcohol, or a combination of these materials. Moreover, an amount of the binder to be added is preferably from 2 to 10 parts by mass to 100 parts by mass of the ceramic raw material.

As the surfactant, ethylene glycol, dextrin, fatty acid soap, polyalcohol or the like can be used. One of these surfactants may be used alone, or a combination of two or more of the surfactants may be used. Moreover, an amount of the surfactant to be added is preferably 2 parts by mass or less to 100 parts by mass of the ceramic raw material.

A content of the water is preferably from 20 to 80 parts by mass to 100 parts by mass of the ceramic raw material.

To form the ceramic forming raw material, first, the ceramic forming raw material is kneaded to obtain a kneaded material, and the obtained kneaded material is preferably formed into a honeycomb shape by extrusion-forming. There is not any special restriction on a method of kneading the ceramic forming raw material to form the kneaded material, and an example of the method is a method using a kneader, a vacuum clay kneader or the like. There is not any special restriction on a method of extruding the kneaded material to obtain the formed honeycomb body. For example, the formed honeycomb body is preferably obtained by extruding the kneaded material by use of a die having a desirable cell shape, partition wall thickness or cell density. As a material of the die, stainless steel which does not easily wear down, a hard metal, "a combination of the stainless steel and the hard metal" or the like is preferable.

There is not any special restriction on a shape of the formed honeycomb body, but the shape is preferably the cylindrical shape (see FIG. 3), a tubular shape in which an end surface is elliptic, a tubular shape in which the end surface has a polygonal shape such as "a square shape, a rectangular shape, a triangular shape, a pentangular shape, a hexagonal shape, or an octagonal shape", or the like.

Moreover, after the above extrusion-forming, the obtained formed honeycomb body may be dried. There is not any special restriction on a drying method, but examples of the drying method include hot air drying, microwave drying, dielectric drying, reduced-pressure drying, vacuum drying, and freeze-drying. Above all, the dielectric drying, the microwave drying, the hot air drying or any combination of these methods is preferably performed.

In the manufacturing method of the honeycomb structure of the present embodiment, the unfired partition walls of the formed honeycomb body have the single layer structure. That is, the unfired partition walls are not provided with "an additional layer to collect the particulate matter", and the unfired partition walls do not have a layered structure of two or more layers including "the additional layer to collect the particulate matter". "The additional layer to collect the particulate matter" means a layer having pore diameters smaller than those of "a partition wall formed by firing the unfired partition wall obtained by the extrusion-forming" (a partition wall portion obtained by the extrusion-forming), a layer made of a material different from that of "the partition wall portion obtained by the extrusion-forming", or the like.

(2-2) Plugging Step:

The manufacturing method of the honeycomb structure of the present embodiment preferably has a plugging step after the forming step. By the plugging step, a plugging material is filled into "the open frontal areas of the predetermined cells" in the one end surface of the honeycomb base material and "the open frontal areas of the remaining cells" in the other end surface of the honeycomb base material, and the plugging material is dried, to form "plugged portions prior to firing".

When the plugging material is filled into the formed honeycomb body, the plugging material is first filled into one end surface side. As a method of filling the plugging material into the one end surface side, a method having a masking step and a press-in step is preferable. The masking step is a step of attaching a sheet to the one end surface of the formed honeycomb body, and making holes in portions of the sheet which overlap with "cells to be provided with the plugged portions". The press-in step is a step of pressing "an end of the formed honeycomb body to which the sheet has been attached" into a container which contains the plugging material, and pressing the plugging material into the cells of the formed honeycomb body. When the plugging material is pressed into the cells of the formed honeycomb body, the plugging material passes through the holes made in the sheet, and is filled into the only cells that communicate with the holes made in the sheet.

The plugging material can be prepared by suitably mixing raw materials which are examples of constituent elements of the above ceramic forming raw material. The ceramic raw material contained in the plugging material is preferably the same type as the ceramic raw material for use as the raw material of the partition walls (but the plugging material does not have to be plate-like).

There is not any special restriction on conditions to dry the plugging material filled into the formed honeycomb body, and known conditions can be used.

Next, the plugging material is filled into the other end surface side. In a method of filling the plugging material into the other end surface side, the plugging material is preferably filled into the open frontal areas of "the cells in which the plugging material is not filled into the one end surface side" by a method similar to the method of filling the plugging material into the above one end surface side.

Next, the plugging material filled into the formed honeycomb body is preferably dried.

Additionally, to dry the plugging material, the plugging material is filled into "both the one end surface side and the other end surface side of the honeycomb base material", and then the plugging material filled into both the end surfaces of the honeycomb base material may simultaneously be dried. Moreover, the plugging material may simultaneously be filled into both the end surfaces of the honeycomb base material.

Moreover, the cells in which the plugging material is filled into the open frontal areas of the one end surface (the plugged portions prior to the firing) and the cells in which the plugging material is filled into the open frontal areas of the other end surface (the plugged portions prior to the firing) are preferably alternately arranged. In this case, the checkered pattern is formed by the open frontal areas of the cells and the plugging material (the plugged portions prior to the firing) in each end surface of the honeycomb base material.

(2-3) Firing Step:

Next, the formed honeycomb body (preferably, the formed honeycomb body provided with the plugged portions prior to the firing) is fired to prepare the honeycomb structure (the firing step).

Prior to the firing (main firing) of the formed honeycomb body, the formed honeycomb body is preferably calcinated. The calcinating is performed for degreasing. There is not any special restriction on a calcinating method, as long as organic substances (the binder (the organic binder), the surfactant, the pore former, etc.) in the formed honeycomb body can be removed. In general, a burning temperature of the organic binder is from about 100 to 300° C., and a burning temperature of the pore former is from about 200 to 800° C. Therefore, as calcinating conditions, heating is preferably performed in an oxidation atmosphere at about 200 to 1000° C. for about three to 100 hours.

The firing (main firing) of the formed honeycomb body is performed so as to sinter and densify the raw material constituting the calcinated formed honeycomb body, thereby acquiring a predetermined strength. Firing conditions (temperature, time, and atmosphere) vary in accordance with the type of the raw material constituting the formed honeycomb body, and hence suitable conditions may be selected in accordance with the type of the raw material. For example, when the cordierite forming raw material is used, the firing temperature is preferably from 1410 to 1440° C. Moreover, the firing time is preferably from four to eight hours, as time to keep the highest temperature. Furthermore, when the silicon-silicon carbide composite material is used, as firing conditions, the heating is preferably performed in an inert atmosphere of nitrogen, argon or the like at 1400 to 1500° C. for one to 20 hours. Moreover, after the firing, an oxygenation treatment is preferably performed at 1200 to 1350° C. for one to ten hours, to enhance a durability. There is not any special restriction on a device which performs the calcinating and main firing, but an electric furnace, a gas furnace or the like can be used.

EXAMPLES

Hereinafter, the honeycomb structure and the manufacturing method of the honeycomb structure according to the present invention will further specifically be described with respect to examples, but the present invention is not limited to these examples.

Example 1

As ceramic raw materials, silicon carbide, metallic silicon and plate-like alumina were used. Silicon carbide and metallic silicon were mixed at a ratio of 80:20 (the mass ratio), and further, plate-like alumina, a pore former and a binder were mixed to prepare a raw material mixture. A content of plate-like alumina was 45 mass % of the whole raw material mixture. Moreover, a content ratio of a plate-like raw material in the ceramic raw material was 44 vol %. Granular raw materials in Table 1 were silicon carbide and metallic silicon. As the pore former, a water-absorbing resin and starch were used. A content of the water-absorbing resin was 6.0 mass % of the whole raw material mixture. A content of starch was 6.0 mass % of the whole raw material mixture. As the binder, hydroxypropyl methylcellulose was used. A content of hydroxypropyl methylcellulose was 7.0 mass % of the whole raw material mixture. A median diameter of the pore former was 46 μm. A long diameter of plate-like alumina was 15 μm. An aspect ratio of plate-like alumina (the long diameter/a short diameter) was 50. A value of a ratio of the long diameter of plate-like alumina to the median diameter of the pore former (plate-like alumina/the pore former) was 3.1. The median diameter of the pore former, the long diameter of plate-like alumina and the aspect ratio of plate-like alumina were values measured by methods described later.

70 parts by mass of water was added to the raw material mixture, when a total content of silicon carbide, metallic silicon and plate-like alumina was 100 parts by mass, to prepare a ceramic forming raw material.

The obtained ceramic forming raw material was kneaded by a kneader for 45 minutes to prepare a kneaded material having plasticity. The obtained kneaded material was formed into a cylinder-like shape by a vacuum clay kneader. Then, the cylinder-like kneaded material was thrown into an extruder, and formed into a honeycomb shape, to obtain a formed body. Next, the obtained formed body was subjected to microwave drying, and then hot air drying (80° C.×12 hours). Afterward, both ends of the formed body were cut so that the formed body had a predetermined dimension. The obtained formed honeycomb body was degreased in the atmosphere at 450° C., and then fired in an inert atmosphere at 1450° C., to obtain a honeycomb structure.

A porosity (the open porosity) of partition walls of the obtained honeycomb structure was 68.9%. Moreover, an average pore diameter of the partition walls was 10.2 µm. Furthermore, "an average open frontal area diameter of pores which were open in the surfaces of the partition walls" was 2.3 µm. Moreover, a value of a ratio of "the average open frontal area diameter of the pores which were open in the surfaces of the partition walls" to "the average pore diameter of the partition walls" (the value of the ratio of a surface open area diameter to the average pore diameter) was 0.23. "The average pore diameter of the partition walls", "the porosity of the partition walls" and "the average open frontal area diameter of the pores which were open in the surfaces of the partition walls" (the surface open area diameter) were values measured by methods described later. Moreover, the partition walls of the obtained honeycomb structure had a single layer structure.

As to the obtained honeycomb structure, "a collecting efficiency", "an initial pressure loss" and "a pressure loss with soot" were measured by the following methods. The results are shown in Table 1. In a column of "the collecting efficiency", "good" indicates that the collecting efficiency is 90% or more. In the column of "the collecting efficiency", "acceptable" indicates that the collecting efficiency is 80% or more and smaller than 90%. In the column of "the collecting efficiency", "bad" indicates that the collecting efficiency is smaller than 80%. In a column of "the initial pressure loss", "good" indicates that the initial pressure loss is 3.5 kPa or less. In the column of "the initial pressure loss", "acceptable" indicates that the initial pressure loss is in excess of 3.5 kPa and 4.0 kPa or less. In a column of "the pressure loss with soot", "good" indicates that the pressure loss with soot is 3.0 kPa or less. In the column of "the pressure loss with soot", "acceptable" indicates that the pressure loss with soot is in excess of 3.0 kPa and 3.5 kPa or less. In the column of "the pressure loss with soot", "bad" indicates that the pressure loss with soot is larger than 3.5 kPa. Moreover, in a column of "general evaluation", "A" indicates that all the evaluation results of "the collecting efficiency", "the initial pressure loss" and "the pressure loss with soot" are "good". "A" is the most suitable result. In the column of "the general evaluation", "B" indicates that the evaluation results of "the collecting efficiency", "the initial pressure loss" and "the pressure loss with soot" have two "good" and one "acceptable". "B" is the suitable result next to "A". In the column of "the general evaluation", "C" indicates that the evaluation results of "the collecting efficiency", "the initial pressure loss" and "the pressure loss with soot" have one "good" and two "acceptable". "C" is the suitable result next to "B". In the column of "the general evaluation", "D" indicates that at least one "bad" is included. "D" indicates that the evaluation results are poor results.

(Median Diameter of Pore Former)

The median diameter was measured by a laser diffraction method.

(Long Diameter of Plate-Like Raw Material)

The long diameter was measured by the laser diffraction method.

(Aspect Ratio of Plate-Like Raw Material)

An SEM photograph of the plate-like raw material was taken. A short diameter of the plate-like raw material was read from the SEM photograph, and the above median diameter measured by the laser diffraction method was used as the long diameter (the long diameter of the plate-like raw material), to calculate the aspect ratio from both the diameters (the long diameter/the short diameter). A magnification of an SEM image was 1000 times.

(Surface Open Area Diameter)

An SEM (scanning electron microscope) photograph of a cross section parallel to the surface of the partition wall was taken. First, the SEM (scanning electron microscope) photograph of the surface of the partition wall was taken. A magnification of the SEM photograph was 500 times. Then, an average value of the short diameters of "the open frontal areas of the pores" in the surface of the partition wall in a region of 50 µm×120 µm was "the surface open area diameter". The short diameters of "the open frontal areas of the pores" can be measured by, for example, the following method. Photographed image data is binarized by using image analysis software "Image-Pro0.5J" (manufactured by NVS Inc.), to clarify a contour of each of the pores. Then, the short diameter of "the open frontal area of the pore" is measured from the obtained data. The short diameter of "the open frontal area of the pore" is the shortest diameter of "the open frontal area of the pore". For example, in the case of a circular shape, a diameter of the shape becomes the short diameter. Moreover, in the case of an elliptic shape, a length of a short axis is the short diameter. Furthermore, in the case of another shape, a length of "the shortest line segment among line segments each of which connects two points on an outer periphery of the shape" is the short diameter.

(Average Pore Diameter of Partition Walls)

The average pore diameter (µm) of the partition walls was measured by mercury porosimetry using a mercury porosimeter (trade name: AutoPore IV9520) manufactured by Shimadzu Corp.

(Porosity of Partition Walls)

The porosity (the open porosity) (µm) of the partition walls was measured by the mercury porosimetry using the mercury porosimeter (trade name: AutoPore IV9520) manufactured by Shimadzu Corp.

(Surface Open Area Ratio of Partition Walls)

First, an SEM (scanning electron microscope) photograph of the surface of the partition wall was taken. A magnification of the SEM photograph was 500 times. Then, a ratio of "the open frontal areas of the pores" in the surface of the partition wall in a region of 50×120 µm was the surface open area ratio. The ratio of "the open frontal areas of the pores" can be measured by, for example, the following method. Photographed image data is binarized by using image analysis software "Image-Pro0.5J" (manufactured by NVS Inc.), to clarify a contour of each of the pores. Then, an area ratio of "the open frontal areas of the pores" to an area of the surface of the partition wall is measured from the obtained data.

(Collecting Efficiency)

A cutout test piece for evaluation was obtained from the honeycomb structure so that an evaluation region of 10 mm×10 mm or more and 50 mm×50 mm or less could be acquired from one partition wall. The obtained test piece was measured by "a PM collecting efficiency measuring device". "The PM collecting efficiency measuring device" includes a main body to which an test piece to be evaluated is attached, and is constituted so that a PM generating device is disposed on an upstream side of the main body to supply a PM generated by this PM generating device to the main body. The test piece to be evaluated is disposed so as to divide (partition) the inside of the main body into the upstream side and a downstream side.

(Initial Pressure Loss)

A cutout test piece for evaluation was obtained from the honeycomb structure so that an evaluation region of 10 mm×10 mm or more and 50 mm×50 mm or less could be acquired from one partition wall. The obtained test piece for evaluation was attached to "the PM collecting efficiency measuring device". "The PM collecting efficiency measuring device" was used in measuring the above (Collecting Efficiency). The above-mentioned main body of "the PM collecting efficiency measuring device" is provided with measuring holes on the upstream and downstream sides of the test piece to be evaluated. Pressures on the upstream and downstream sides of the test piece to be evaluated can be measured by the measuring holes, respectively. When the initial pressure loss (kPa) is measured, air is supplied to the main body while the PM is not generated. Specifically, the air which does not contain the PM is supplied to the main body, and transmitted through the test piece to be evaluated. At this time, a flow speed (a penetration flow speed) at the penetration of the air which does not contain the PM through the test piece to be evaluated is regulated to an arbitrary point of 30 cm/second or more and 2 m/second or less. Then, a difference between the pressure measured by the measuring hole on the upstream side and the pressure measured by the measuring hole on the downstream side is obtained as the initial pressure loss (kPa).

(Pressure Loss with Soot)

Similarly to the above measuring method of "the initial pressure loss", the test piece to be evaluated was attached to "the PM collecting efficiency measuring device". Then, air containing the PM was allowed to penetrate through the test piece to be evaluated. Then, the initial pressure loss was subtracted from a value of the difference between the pressure measured by the measuring hole on the upstream side and the pressure measured by the measuring hole on the downstream side at a time when 0.03 mg of PM was deposited per square centimeter of the test piece to be evaluated, to obtain a PM deposition pressure loss increase (kPa).

TABLE 1

| | Plate-like raw material ratio (vol %) | Granular raw material (vol %) | Total | Type of plate-like raw material | Long dia. of plate-like raw material (μm) | Median dia. of pore former (μm) | Plate-like raw material/ pore former particle dia. Ratio | Aspect ratio of plate-like raw material | Porosity (%) |
|---|---|---|---|---|---|---|---|---|---|
| Example 1 | 44 | 56 | 100 | Alumina | 15 | 46 | 0.33 | 50 | 68.9 |
| Example 2 | 100 | 0 | 100 | | 15 | 46 | 0.33 | 50 | 70.0 |
| Example 3 | 100 | 0 | 100 | | 15 | 30 | 0.50 | 50 | 74.7 |
| Example 4 | 100 | 0 | 100 | | 15 | 60 | 0.25 | 50 | 75.7 |
| Example 5 | 50 | 50 | 100 | | 15 | 46 | 0.33 | 50 | 68.5 |
| Example 6 | 21 | 79 | 100 | | 15 | 46 | 0.33 | 50 | 62.7 |
| Example 7 | 14 | 86 | 100 | | 15 | 46 | 0.33 | 50 | 63.1 |
| Example 8 | 100 | 0 | 100 | SiC | 2 | 30 | 0.07 | 5 | 74.7 |
| Comparative Example 1 | 10 | 90 | 100 | Alumina | 15 | 46 | 0.33 | 50 | 62.0 |
| Comparative Example 2 | 6 | 94 | 100 | | 15 | 46 | 0.33 | 50 | 63.0 |
| Comparative Example 3 | 2 | 98 | 100 | | 15 | 46 | 0.33 | 50 | 61.3 |
| Comparative Example 4 | 0 | 100 | 100 | | — | 46 | — | — | 55.7 |
| Comparative Example 5 | 100 | 0 | 100 | SiC | 33 | 46 | 0.72 | 3 | 60.5 |
| Comparative Example 6 | 100 | 0 | 100 | | 33 | 30 | 1.10 | 3 | 58.0 |

| | Surface open area ratio (%) | Surface open area dia. (μm) | Ave. pore dia. (μm) | Value of ratio of surface open area dia. to average pore dia. | Collecting efficiency | Initial pressure loss | Pressure loss with soot | General evaluation |
|---|---|---|---|---|---|---|---|---|
| Example 1 | 31.0 | 2.3 | 10.2 | 0.23 | good | good | good | A |
| Example 2 | 25.2 | 0.7 | 7.0 | 0.10 | good | acceptable | good | B |
| Example 3 | 28.0 | 0.6 | 6.5 | 0.09 | good | acceptable | good | B |
| Example 4 | 27.5 | 0.9 | 9.6 | 0.09 | good | acceptable | good | B |
| Example 5 | 30.4 | 1.1 | 9.5 | 0.12 | good | acceptable | good | B |
| Example 6 | 33.4 | 3.7 | 14.4 | 0.26 | good | good | good | A |
| Example 7 | 34.1 | 6.4 | 15.4 | 0.42 | acceptable | good | acceptable | C |
| Example 8 | 24.5 | 0.5 | 10.5 | 0.05 | good | acceptable | good | B |
| Comparative Example 1 | 34.3 | 10.5 | 18.0 | 0.58 | bad | good | acceptable | D |
| Comparative Example 2 | 35.2 | 13.0 | 16.0 | 0.82 | bad | good | bad | D |

TABLE 1-continued

| | | | | | | | |
|---|---|---|---|---|---|---|---|
| Comparative Example 3 | 41.0 | 16.3 | 17.2 | 0.95 | bad | good | bad | D |
| Comparative Example 4 | 41.5 | 18.0 | 18.0 | 1.00 | bad | good | bad | D |
| Comparative Example 5 | 43.2 | 19.0 | 20.0 | 0.95 | bad | good | bad | D |
| Comparative Example 6 | 45.0 | 13.0 | 15.0 | 0.87 | bad | good | bad | D |

Examples 2 to 8 and Comparative Examples 1 to 6

Honeycomb structures were prepared similarly to Example 1, except that manufacturing conditions were changed as shown in Table 1. The obtained honeycomb structures were evaluated similarly to Example 1. The results are shown in Table 1.

It is seen from Table 1 that when "the value of the ratio of the surface open area diameter to the average pore diameter" is 0.26 or less, the generation judgment is "A" or "B" and that when the value is in excess of 0.26 and 0.42 or less, the general judgment is "C" and passable. It is seen that when "the value of the ratio of the surface open area diameter to the average pore diameter" is 0.58 or more, the collecting efficiency and the pressure loss with soot are poor, and the general judgment is "D" and rejectable.

A honeycomb structure of the present invention can suitably be used as a filter to purify gases discharged from an internal combustion engine such as a diesel engine and various combustion devices. Moreover, a manufacturing method of the honeycomb structure of the present invention can suitably be used to manufacture such a honeycomb structure.

DESCRIPTION OF REFERENCE MARKS

1: partition wall, 2: cell, 3: outer peripheral wall, 4: honeycomb base material, 5: plugged portion, 11: one end surface, 12: other end surface, 20: formed honeycomb body, 21: unfired partition wall, 22: cell, 23: outer peripheral wall, 30: partition wall, 31: surface (partition wall surface), 32: pore, 33: open frontal area, 34: plate-like raw material, 35: granular raw material, and 100 and 200: honeycomb structure.

What is claimed is:

1. A honeycomb structure comprising a honeycomb base material having porous partition walls with which a plurality of cells are formed to become through channels of a fluid, wherein a value of a ratio of an average open frontal area diameter of pores which are open in the surfaces of the partition walls to an average pore diameter of the pores formed in the partition walls is from 0.05 to 0.45, wherein an open frontal area diameter of each of the pores which are open in the surfaces of the partition walls is from 0.5 to 3.7 μm, and the partition walls have a single layer structure.

2. The honeycomb structure according to claim 1, wherein the average pore diameter of the partition walls is from 5.0 to 30.0 μm.

3. The honeycomb structure according to claim 1, wherein a surface open area ratio of the partition walls is from 20 to 40%.

4. The honeycomb structure according to claim 1, wherein a material of the partition walls includes at least one selected from the group consisting of silicon carbide, a silicon-silicon carbide composite material, alumina, cordierite and aluminum titanate.

5. The honeycomb structure according to claim 1, comprising:
plugged portions arranged in open frontal areas of the predetermined cells in one end surface of the honeycomb base material and open frontal areas of the remaining cells in the other end surface of the honeycomb base material.

* * * * *